(No Model.)
M. KANE
NUT LOCK.
No. 415,786. Patented Nov. 26, 1889.
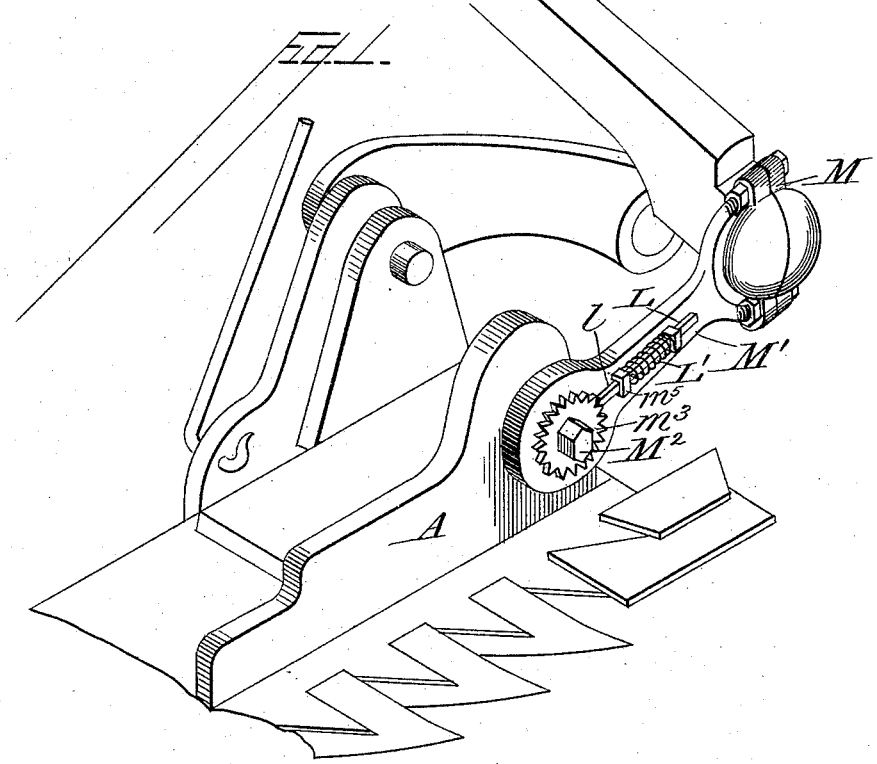
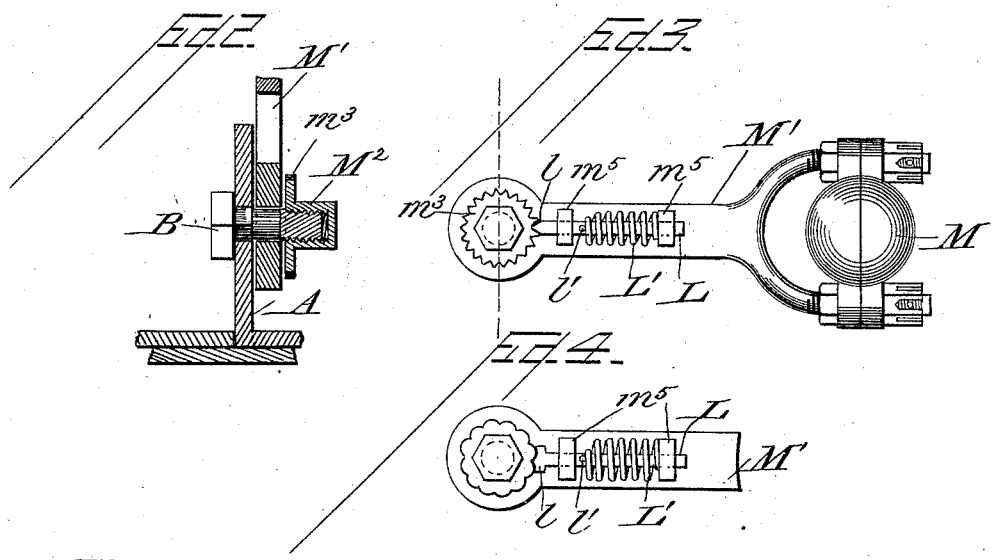
Attest:
F. H. Schott
J. H. Brown
Inventor
Maurice Kane,
by G. P. Smith
his Atty

UNITED STATES PATENT OFFICE.

MAURICE KANE, OF CHICAGO, ILLINOIS, ASSIGNOR TO THE WARDER, BUSHNELL & GLESSNER COMPANY, OF SPRINGFIELD, OHIO.

NUT-LOCK.

SPECIFICATION forming part of Letters Patent No. 415,786, dated November 26, 1889.

Original application filed July 2, 1889, Serial No. 316,318. Divided and this application filed September 30, 1889. Serial No. 325,571. (No model.)

*To all whom it may concern:*

Be it known that I, MAURICE KANE, a citizen of the United States, residing at Chicago, in the county of Cook and State of Illinois, have invented certain new and useful Improvements in Nut-Locks; and I do hereby declare the following to be a full, clear, and exact description of the invention, such as will enable others skilled in the art to which it appertains to make and use the same.

My invention consists in the improved nut-lock hereinafter to be described and claimed, this application being a division of my previous application filed July 2, 1889, Serial No. 316,318.

In the drawings, Figure 1 is a perspective view of one form of my invention as applied to a pitman and connecting-pieces. Fig. 2 is a vertical section through the center of the bolt. Fig. 3 is a side view, and Fig. 4 shows a modification of my invention.

In many cases in mechanism it is necessary to have a joint which shall permit of a certain amount of lateral play without permitting the motion of the parts to produce any tightening or loosening of the joints. Such a construction should be simple and readily adjustable, and to accomplish this I have designed the following.

I have shown my invention as applied to certain parts of a mowing-machine.

M' is the pitman of a mowing-machine. Any other rapidly-moving machine part would do.

A is the cutter-bar, driven by the pitman. In this cutter-bar A is set so that it cannot turn a bolt B, which passes through the perforated end of the pitman and affords a bearing for the latter. The end of this bolt is threaded and has upon it a nut $M^2$, to which is attached, either by casting therewith or otherwise, a collar or flange $m^3$, upon the circumference of which are suitable corrugations.

Mounted on the pitman M' by the lugs $m^5$ $m^5$ is the sliding bolt L. This bolt has one end $l$ of a form to fit in between the corrugations on the flange $m^3$. A spiral spring L' is pressed between one of these lugs and any suitable projection $l'$ upon the bolt. The other end M of the pitman is of course attached to any suitable crank-arm or other driving element and is rapidly reciprocated. This rapid reciprocation renders it necessary that the pressure of the pitman upon the cutter-bar A should not be too great, and at the same time the nut $M^2$ must be held in position securely, so that the rapid vibration to which it is subjected will not further loosen it and eventually break the connection and disable the machine. This is accomplished by the restraining action of the bolt entering between the corrugations in the circumference of the flange upon the nut, as shown. At the same time the restraining influence of said bolt is not sufficient to overcome the pressure when a wrench is applied to the nut and it is turned to the right or left in order to attain a different degree of adjustment.

Of course it is evident that the spirit of my invention will not be departed from, whatever the shape of the corrugations in the nut-flange, so long as their sides are inclined to the radii of the nut at a sufficient angle to enable the bolt to slip over and by them under pressure. Thus a modified form of corrugations which are circular may be used, as shown in Fig. 4, or the preferred form of V-shaped teeth may be used, as shown in Fig. 1.

I am aware of the patent granted to one Thomas, November 2, 1880, No. 284,090, which shows a construction similar somewhat to mine, but in which the feature of adjustability without the withdrawal of the bolt does not appear. This is a most important feature in many cases—for instance, in mowing-machines, where an adjustment must be made in the field, and the workman, holding the reins in one hand, has only one hand with which to work. In the Thomas construction it is necessary to hold back the bolt during the adjustment of the nut and then allow it to slip forward again.

Having described my invention, what I claim as new, and desire to protect by Letters Patent, is—

1. In a nut-lock, the combination of a nut and a bolt on which it turns, a projecting flange upon said nut which has upon its circumference certain corrugations, the sides of which corrugations being inclined at a considerable angle to the radii of the nut, and a spring-pressed bolt which engages with said corrugations and has a point conforming to the same in shape, substantially as described.

2. In a nut-lock, the combination of the nut and the bolt on which it turns, the flange upon said nut, which has V-shaped teeth cut in its circumference, and a spring-pressed bolt which has a V-shaped point which engages with said V-shaped teeth, substantially as described.

In testimony whereof I affix my signature in presence of two witnesses.

MAURICE KANE.

Witnesses:
R. C. HASKINS,
A. V. STEWART.